US007822805B1

(12) United States Patent (10) Patent No.: US 7,822,805 B1
Singh et al. (45) Date of Patent: Oct. 26, 2010

(54) METHOD AND APPARATUS FOR SCREENING A POTENTIAL CUSTOMER AND ASSIGNING AN ACCOUNT NUMBER TO THE POTENTIAL CUSTOMER ACROSS A GLOBAL COMPUTER NETWORK

(75) Inventors: Vikram Singh, Milwaukee, WI (US); Lisa McClung, Chicago, IL (US); Gilbert C. L. Leong, Singapore (SG); Karl-Heinz Hetfleisch, JohannisbrunnelstraBe (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/468,752

(22) Filed: Dec. 21, 1999

(51) Int. Cl.
 *G06F 15/16* (2006.01)
(52) U.S. Cl. .......................... 709/203; 705/26; 235/383
(58) Field of Classification Search .................. 705/26, 705/38, 1.1, 22; 235/376, 380, 381, 382, 235/382.5, 383, 385; 709/203, 223, 224
 See application file for complete search history.

(56) References Cited

U.S. PATENT DOCUMENTS

| 4,866,661 | A | * | 9/1989 | de Prins ....................... 235/382 |
| 5,263,167 | A | * | 11/1993 | Conner et al. ....................... 1/1 |
| 5,347,632 | A | * | 9/1994 | Filepp et al. ................. 709/202 |
| 5,592,375 | A | * | 1/1997 | Salmon et al. .................. 705/7 |
| 5,720,363 | A | * | 2/1998 | Kipp ........................... 186/55 |
| 5,732,400 | A | * | 3/1998 | Mandler et al. ............... 705/26 |
| 5,758,072 | A | * | 5/1998 | Filepp et al. ................. 709/220 |
| 5,758,095 | A | * | 5/1998 | Albaum et al. .................. 705/2 |
| 5,790,634 | A | * | 8/1998 | Kinser, Jr. et al. ............. 379/29 |
| 5,845,255 | A | * | 12/1998 | Mayaud .......................... 705/3 |
| 5,912,818 | A | * | 6/1999 | McGrady et al. ............ 700/232 |
| 5,968,110 | A | * | 10/1999 | Westrope et al. .............. 703/27 |
| 6,016,504 | A | * | 1/2000 | Arnold et al. ............... 709/200 |
| 6,021,392 | A | * | 2/2000 | Lester et al. .................... 705/2 |
| 6,067,524 | A | * | 5/2000 | Byerly et al. ................... 705/3 |
| 6,072,982 | A | * | 6/2000 | Haddad ...................... 455/4.2 |
| 6,088,686 | A | * | 7/2000 | Walker et al. ................. 705/38 |

(Continued)

OTHER PUBLICATIONS

Felvey, John, Cross-Selling by Computer, Bank Marketing; Washington, 1 page, Jul. 1982.*

(Continued)

*Primary Examiner*—Andrew Joseph Rudy
(74) *Attorney, Agent, or Firm*—Ziolkowski Patent Solutions Group, SC

(57) ABSTRACT

A system and method for screening a potential customer and assigning an account number to the potential customer prior to permitting the potential customer to purchase products or services from an automated seller facility over a computer network, such as the Internet, is disclosed. The potential customer enters customer data into a user interface to be received by the seller in the automated seller facility so that the seller can check the potential customer's qualifications. The invention includes performing an initial screening to determine whether the potential customer is qualified to purchase the products or services from the seller. If the potential customer passes the initial screening, an account number is issued to the potential customer. The account number allows the potential customer further access to the automated seller facility so that the potential customer may make an offer to purchase products or services while the automated seller facility performs a complete screening.

23 Claims, 4 Drawing Sheets

U.S. PATENT DOCUMENTS

| | | | | |
|---|---|---|---|---|
| 6,112,182 | A * | 8/2000 | Akers et al. | 705/2 |
| 6,134,315 | A * | 10/2000 | Galvin | 379/219 |
| 6,154,738 | A * | 11/2000 | Call | 707/4 |
| 6,163,732 | A * | 12/2000 | Petke et al. | 700/106 |
| 6,202,060 | B1 * | 3/2001 | Tran | 707/3 |
| 6,212,634 | B1 * | 4/2001 | Geer, Jr. et al. | 713/156 |
| 6,226,623 | B1 * | 5/2001 | Schein et al. | 705/35 |
| 6,249,773 | B1 * | 6/2001 | Allard et al. | 705/26 |
| 6,311,169 | B2 * | 10/2001 | Duhon | 705/38 |
| 6,317,729 | B1 * | 11/2001 | Camp et al. | 705/79 |
| 6,321,339 | B1 * | 11/2001 | French et al. | 713/201 |
| 6,332,025 | B2 * | 12/2001 | Takahashi et al. | |
| 6,354,490 | B1 * | 3/2002 | Weiss et al. | 235/379 |
| 6,598,027 | B1 * | 7/2003 | Breen et al. | 705/26 |
| 6,785,661 | B1 * | 8/2004 | Mandler et al. | 705/39 |
| 7,051,000 | B2 * | 5/2006 | Kodama et al. | 705/37 |
| 7,103,568 | B1 * | 9/2006 | Fusz et al. | 705/26 |
| 7,231,380 | B1 * | 6/2007 | Pienkos | 1/1 |
| 7,249,097 | B2 * | 7/2007 | Hutchison et al. | 705/39 |
| 2001/0042026 | A1 * | 11/2001 | Hinh et al. | 705/26 |

OTHER PUBLICATIONS

Miller, Paul, Knowing who's a bad risk, Catalog Age; New Canaan, 3 pages, Sep. 1998.*

Wolff, Mark R., Is That Customer a Potential Bankrupt?, Bottomline; Washington, 2 pages, Jan. 1988.*

Pender, Kathleen, "Rating the Credit Customer/Fair, Isaac issues scorecards to help consumer lending," San Francisco Chronicle, Feb. 17, 1992, 4 pages.*

Gerlach, Kara, "Fair credit reporting change opens marketing oportunity for lenders," Real Estate Finance Today, Nov. 25, 1996, 3 pages.*

Phillips Business Information Corporation, "Technology Score Board," Credit Risk Management Report, Feb. 8, 1999, 2 pages.*

\* cited by examiner

METHOD AND APPARATUS FOR SCREENING A POTENTIAL CUSTOMER AND ASSIGNING AN ACCOUNT NUMBER TO THE POTENTIAL CUSTOMER ACROSS A GLOBAL COMPUTER NETWORK

BACKGROUND OF THE INVENTION

The present invention relates generally to electronic commerce that takes place across a global computer network and more particularly to screening transactions across the Internet.

Electronic commerce offers many opportunities to market and sell products on a worldwide basis at a fraction of the cost associated with traditional sales methods. However, electronic transactions create potential problems and risks as well. As business moves swiftly to provide products and services over the Internet, there are a variety of issues that must be considered and safeguarded against.

Frequently little, if anything, is known about a customer who wishes to buy a product or service over the Internet. Still a customer must often be qualified in some way to purchase certain items. For instance, the purchase of certain types of weapons such as handguns, may require a potential customer to be screened by submitting to a background check. Implementing a transaction screening method becomes more difficult when the transaction takes place electronically.

Under Food and Drug Administration (FDA) regulations and equivalent non-U.S. regulations, medical devices may only be sold for use by licensed medical practitioners, or in the alternative, to authorized distributors of medical equipment. Additionally, a distribution contract may need to be in place before completing a sale. Finally, in order to sell a medical device, the device itself may have to be registered, or otherwise approved, in the country of sale. Therefore, when a sales transaction involving medical products takes place electronically, there must exist a mechanism to ensure that such equipment is not improperly sold, either to an unauthorized purchaser, or to a purchaser located in an unauthorized locale.

It would therefore be desirable to have a clearly-defined and appropriately-scoped review process that is designed to acquire the information about the potential customer necessary to ensure a proper sale of such restricted products. Further, it would be desirable for the review process to be applicable for consistent use by all components of a business, thus reducing the amount of variation associated with the electronic sales transactions. Therefore, it would be desirable to have an efficient method and system for screening a potential customer.

SUMMARY OF THE INVENTION

The present invention is a method and system for screening potential customers for transactions that take place over a global computer network that overcomes the aforementioned problems and meets the aforementioned requirements.

The present invention describes a technique by which a potential customer may be screened and then assigned an account number prior to being permitted to purchase products or services. The transaction takes place electronically, thus avoiding the necessity for the seller and/or buyer to travel to meet one another. The invention involves screening a potential customer using customer data that is requested by the seller and entered by the customer at a user interface. This is done to ensure that the customer is authorized, or qualified, to purchase the specified product or service.

In accordance with one aspect of the invention, a method for screening a potential customer and assigning an account number to the potential customer before the potential customer is determined to be qualified to purchase products or services over a global computer network, such as the Internet, is disclosed. The invention includes providing a user interface for a potential customer to access, over the computer network, an automated seller facility. The user interface is configured to allow the potential customer to enter customer data to purchase products or services from the automated seller facility. The invention comprises receiving the customer data in the automated seller facility from the customer by way of the user interface and over the computer network. The invention further includes performing an initial screening of the potential customer to determine whether the potential customer is qualified to purchase products or services from the seller. If the potential customer passes the initial screening, an account number is issued. The account number allows the potential customer further access to the automated seller facility. The customer may then proceed to make an offer to purchase products or services from the automated seller facility while the automated seller facility performs a complete screening of the potential customer.

In accordance with another aspect of the invention, the above-described steps are accomplished by a network-based system for screening a potential customer and assigning an account number to that customer. The system also includes a supplier network of computers comprising a first tier computer system that is programmed to receive customer data from a customer accessible computer. The first tier system is further programmed to confirm that the customer data is complete so that a potential customer may be initially screened prior to being issued an account number. Once initially screened and issued an account number, the potential customer is allowed further access to the automated seller facility. The network-based system's supplier network also includes a second tier computer system which is programmed to receive the customer data and perform a complete screening of the potential customer while the potential customer is simultaneously allowed further access to the automated seller facility to place an offer to purchase products or services from the automated seller facility.

In accordance with another aspect of the invention, a computer readable medium is disclosed having thereon a computer program for use with one or more computers. The program, when executed, causes the one or more computers to acquire customer information from a potential customer who is able to access, by way of a user interface, an automated seller facility to offer to purchase products or services. The computer program causes the computers to issue an account number to the potential customer if the potential customer passes the initial screening. The account number permits the potential customer to further access the automated seller facility. The computers are then caused to conduct a complete screening while at the same time allowing the potential customer to place an order for products or services.

The present invention is particularly useful for screening the potential customer in electronic direct-sale transactions taking place over the Internet. Using the invention provides a fast, secure, and automated way of ensuring that a variety of goods and services, some restricted and some not, are able to be purchased by appropriately-authorized customers only or shipped to non-restricted locations.

Various other features, objects and advantages of the present invention will be made apparent from the following detailed description and the drawings.

BRIEF DESCRIPTION OF THE DRAWINGS

The drawings illustrate the best mode presently contemplated for carrying out the invention.

In the drawings.

DETAILED DESCRIPTION OF THE PREFERRED EMBODIMENT

Figure 1:
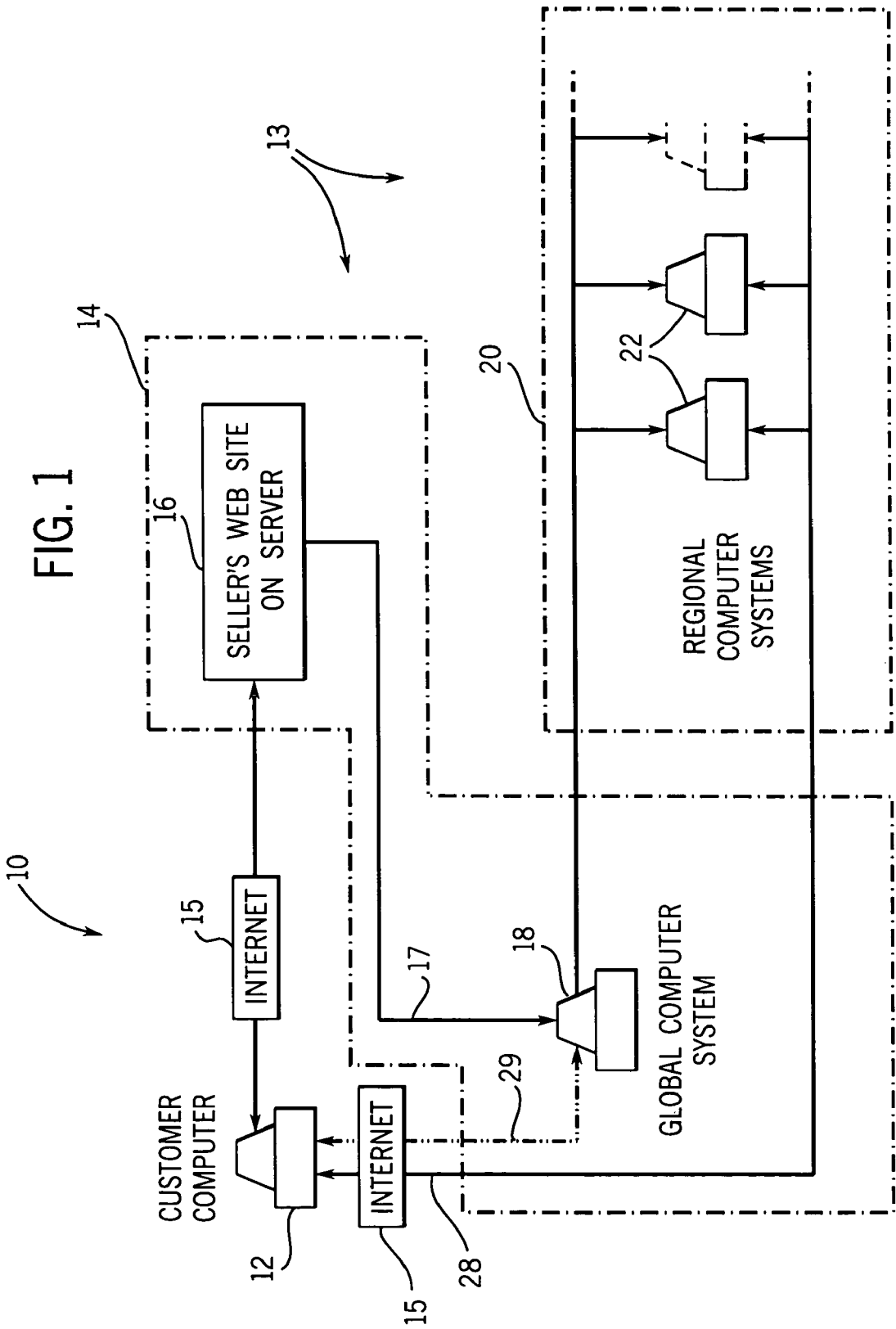
FIG. 1 is a schematic block diagram of a network system for use with the present invention.

FIG. 1 shows the major components of a preferred computer network system 10 for screening transactions in accordance with the present invention. More specifically, the system 10 operates to screen transactions involving a customer transacting for products or services (hereon referred to generally as "products") over a globally accessible computer network such as the Internet. The system segregates the products sought into two general categories: restricted products and non-restricted products. The restricted products are restricted for purchase to authorized buyers of those products. Authorized buyers hereby include licensed health care professionals, those entities that employ licensed health care professionals, and authorized health care distributors. Unrestricted or non-restricted products may be purchased by a more general group of buyers who may be authorized to purchase based on less stringent qualifications, for instance creditworthiness. The term "customer" hereby refers to an individual or entity who proposes to purchase goods or services, and more generally, and with regard to the preferred embodiment, a "customer" is one the system and method must deal with one way or another. In the present invention, a "customer" must be dealt with regardless of whether or not a purchase for goods or services ultimately takes place. In other words, a "customer" need not necessarily be one who actually buys a product, but includes those who are refused—or choose not to complete—such a transaction.

The invention is described in terms of the preferred embodiment wherein the product desired for purchase by the customer falls within a restricted product category if it includes such items as medical equipment, such as computer tomography (CT) scanners, magnetic resonance (MR) imagers, ultrasounds and the like, or product information relating to medical equipment, or service information pertaining to medical equipment and/or services. Such restrictions are typically required by a governmental agency, such as the Food and Drug Administration in the United States. A non-restricted or unrestricted product category includes those products that can be purchased by a general group of purchasers. The system 10 therefore delineates between restricted and non-restricted products. To purchase a restricted product, the customer must be authorized, or otherwise pre-approved for such purchases. It should be apparent then that this system can be applicable to screening other types of restricted products or sales/delivery to restricted locations, and that the restricted products described herein are exemplary only. Therefore, this system would be useful for selling practically any products requiring buyer identification, other than for simple credit approval, prior to approving the sale. The restricted locations are restricted based on such factors as trade regulations as specified by various government entities.

The network includes a customer accessible computer 12 which provides a user interface to allow a customer to access an automated seller facility 13, having a first tier system 14, and a second tier system 20. Access is provided by way of a globally accessible computer network 15, such as the Internet. The automated seller facility 13 includes server 16 having a seller's web site thereon which is accessible to the buyer via the network 15.

Once having accessed the seller's web site, which is connected to a supplier network by a communication line 17, the customer provides specific customer identification information. An initial first tier screening is performed by a processor at server 16 or at a processor within a global computer processing system 18 to reject any order that is incomplete. The global processing center 18 is preferably situated in the seller's country of business. The automated seller facility 13 receives the customer information from the customer accessible computer 12, including a product order specifying the desired product and/or services. A product order, as used herein, preferably refers to an offer to purchase by the customer, but it should also be understood to include a purchase acceptance by the customer.

After the initial screening in the first tier system 14, an approved prospective purchase offer proceeds to a second tier system 20 having regional computer systems 22 connected with the global processing center 18. The regional systems 22 are preferably situated in the buyer's country of business or in a country having a processing center responsible for a number of countries, one of which is the customer's designated country. The regional systems 22 are considered to be part of the second tier screening system 20 because of the level of processing required and the databases needed. If the buyer and seller are located in the same country, the regional computer systems 22 may be located in the same country as the global computer systems 18, and thus could be incorporated into the first tier system 14.

The regional processing centers 22 constitute the second level or tier system 20 for screening the transaction between the seller and the customer. The specific methods for screening will be discussed below with reference to FIGS. 2-4. Generally, the second tier computer system 20 receives the customer information and performs a complete screening of the potential customer to ensure that the customer is an authorized purchaser of the product selected for purchase or that the product is being shipped to an unrestricted location, as well as performing a credit worthiness function. The overall system 10 permits direct correspondence, such as by email, via communication lines 28 and 29 between the customer accessible computer 12 and the global and regional processing centers 18, 22. Communication line 29 is dashed to indicate that direct correspondence between the customer accessible computer 12 and the global processing center 18 can take place when the global processing center conducts second tier screening of the customer. Direct communication is possible throughout the processing of the transaction as will be further described hereinafter.

Figure 2:
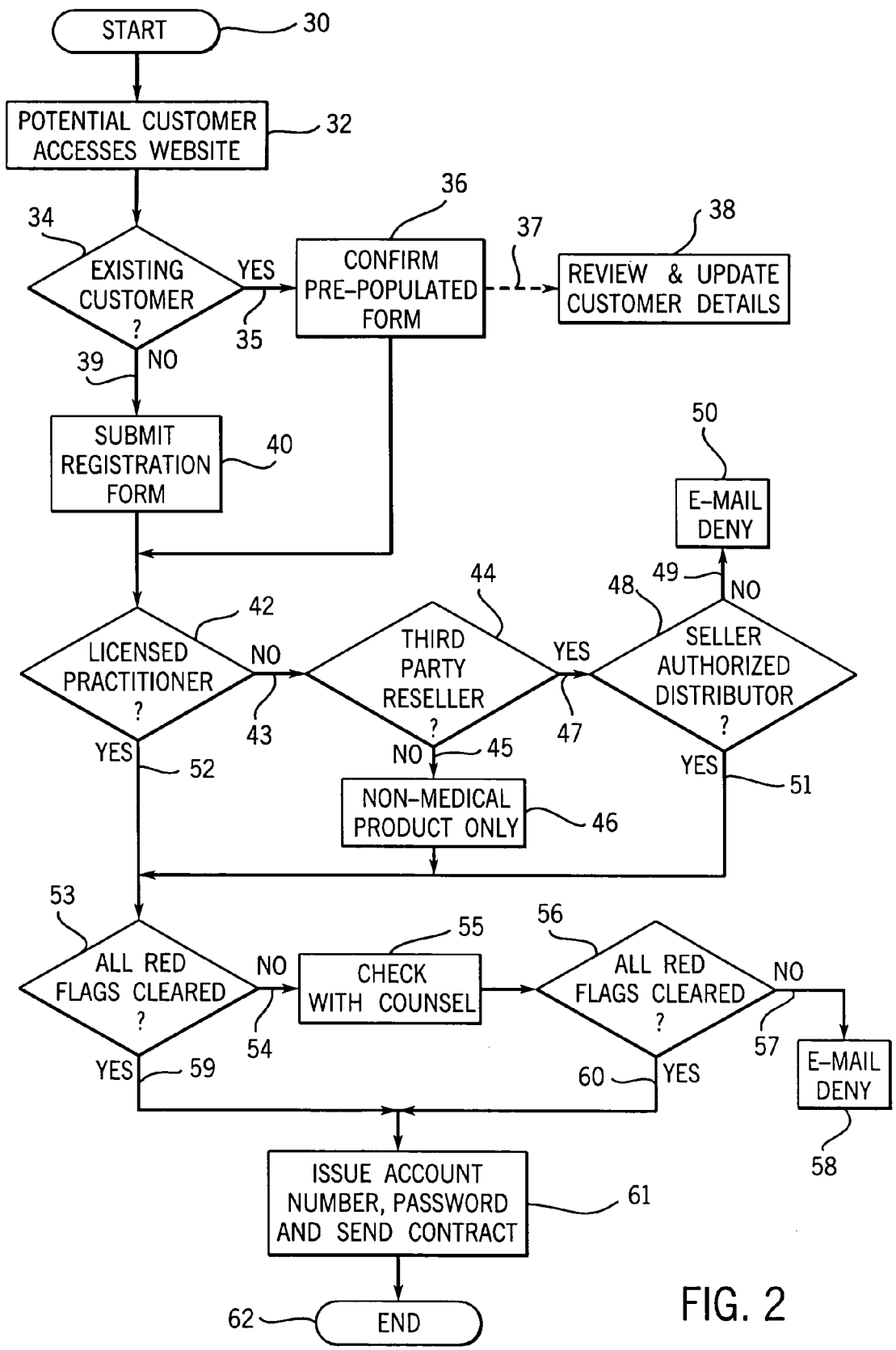
FIG. 2 is a flowchart representing one embodiment of the present invention for use with the system of FIG. 1 for use by a potential customer without an account number.

In FIG. 2, a potential customer initiates a transaction 30 to purchase products, which have been segregated into unrestricted and restricted product categories, by using a computer to connect to the Internet, and subsequently, to gain access to the seller's web site 32. After accessing the web site 32, the system begins an initial screening of the potential customer. The system checks to determine whether the customer is an existing customer 34 with an account number. If so 35, an online registration form is provided having fields for existing customer data that are already entered using information stored in a seller-accessible database. It is then the customer's responsibility to confirm the pre-populated customer details 36 for correctness, with such confirmation permitting the potential customer to bypass the initial screening step. Customer data might include: customer name, billing and shipping addresses, country of residence, entity type (i.e., corporation, partnership, individual) as well as other required pertinent information. Preferably, such customer details will be periodically queried for accuracy, and where necessary, updated 38 in a database. The periodic nature of such updates is represented by a dashed line 37. If the customer is not an existing customer 34, 39, the customer submits an online registration form 40 to provide the seller with the requisite customer identifying information and the potential customer is initially screened.

The registration form itself includes a number of fields to be completed by the potential customer in a user interface, preferably a graphical user interface, which is provided by the seller's web site. The submitted registration form 40 must have every required field in the user interface properly completed. Where required data is missing or immediately determined to be invalid, such as an improper zip code, the system will restrict the customer from transacting until the required fields are completed properly. A country designated by a customer must be a country in which the seller is authorized to do business. All such permitted countries may be provided by the seller, for example in a drop-down menu within the graphical user interface.

Once a valid customer registration form has been submitted 40, the system then proceeds to check whether the customer is qualified to purchase the product or service over the network. This is accomplished by checking whether the customer is a licensed health care provider 42, as such providers are authorized to purchase restricted medical products. If the customer does not fall within the licensed health care provider group 43, which as previously noted may include entities that employ licensed health care providers, the system automatically checks to determine whether the customer is a third party reseller or distributor 44 of medical products. If not 45, the customer will only be permitted to purchase non-medical products 46 in the transaction, or, more generally, products from the unrestricted product category. If the customer does qualify as a third party reseller 44, 47, the system checks to determine whether the customer is a distributor who has been specifically authorized by the seller 48 to purchase medical products. If not 49, the system will deny any sale to the potential customer and an email indicating the denial will be sent to the customer 50, alternatively, a direct customer contract or interaction may be made. These checks ensure that medical products are purchased for use by only those who are authorized. Further, they function to ensure that sensitive pricing and/or product information may only be accessed by such authorized customers.

If however, the customer is a seller-authorized distributor 48, 51, and similarly if the customer is a licensed practitioner 42, 52 or is buying for use by such a licensed practitioner, the system checks to determine whether all "red flags" have been cleared 53. Red flags are inconsistencies in the customer-provided data such as: customer identification details that do not appear to match those of a medical practitioner, clinic, or hospital; a customer who appears to be an overseas purchasing agency, although based in the seller's country; and inconsistent billing and shipping addresses. If all red flags are not cleared 54, the system provides for contacting and checking with the appropriate counsel 55, such as legal counsel or contract manager, who then document and review the relevant issues. Once accomplished, the system revisits the question of whether all red flags have been cleared 56, and if not 57, the customer is prohibited from transacting further and is sent an email 58 indicating the same. If all red flags are cleared 53, 59 or 56, 60, the customer has been determined by the system to be an authorized buyer of restricted, and in this case medical, products or even unrestricted products but not to restricted locations. As such, the system then issues the customer an account number and password, and proceeds to send the customer an electronic business contract since the potential customer is not existing customer 61. The contract can then be completed after the customer obtains the authorization code, which can include the account number and password or login ID so as to enable the customer to proceed while the contract is processed. The account number and password or login ID, which are unique to the particular customer, provide the potential customer with the appropriate security access to proceed with their intended purchase, and they indicate that the potential customer has passed the initial screening. This completes the flow chart process 62 of FIG. 2.

Figure 3:
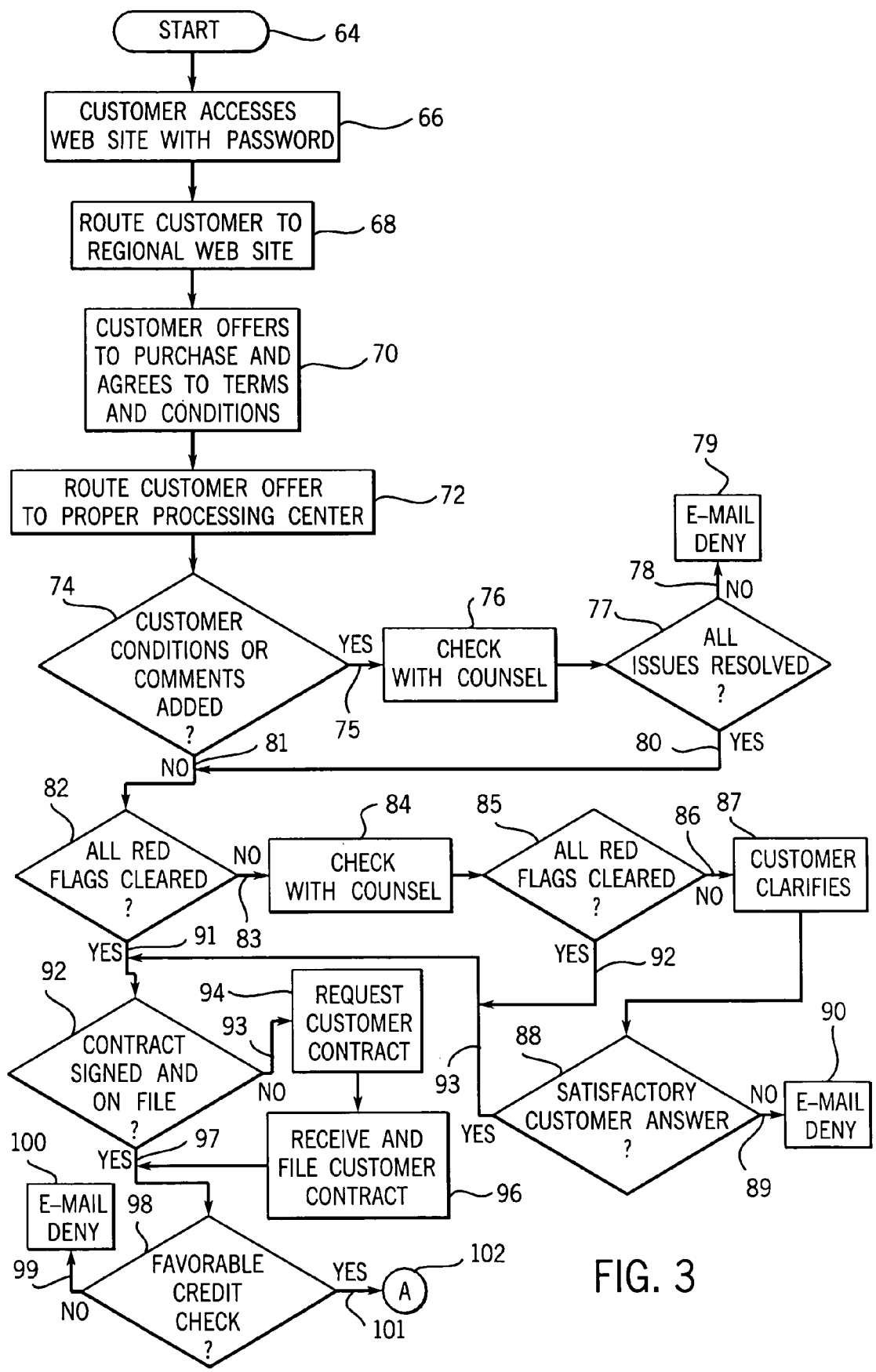
FIGS. 3 and 4 is a flowchart representing one embodiment of the present invention for use with the system of FIG. 1 and for use by a potential customer after an account number is assigned.

Referring to FIG. 3, the customer begins 64 by accessing the seller's web site 66 using the account number and password acquired at 61 of FIG. 2. The customer is then automatically routed by the system to a regional web site 68, FIG. 3, or in other words, a web site whose content specifically pertains to the destination country of the desired product, the potential customer's country. This is done to ensure that sensitive pricing or pertinent terms and conditions of sale and/or information which the customer accesses is from the relevant country only, and further, to provide for efficient access to that information.

Next, the potential customer proceeds with making an offer 70 to purchase products, and thus, is allowed further access to the automated seller facility 13 while the system simultaneously proceeds with performing the complete screening of the potential customer. By submitting an offer, the potential customer agrees to the terms and conditions of sale which have been defined by the seller. The terms and conditions include such items as allowing the seller to run a credit check on the purchaser and stipulating specific financing terms to ensure that the purchaser is indeed authorized to purchase the products specified in the product order. In rare conditions, the customer may, if he chooses, ask if additional terms and conditions can be added or the existing terms and conditions be modified, or simply state additional comments, if desired. Once the offer is sent by the customer, it is routed to the proper regional processing center 72 where the information provided by the potential customer may be further evaluated. The offer to purchase is then checked to determine if any terms and conditions modified or additional terms and conditions have been added 74 by the buyer. If so 75, the buyer-specified terms and conditions in the offer are checked by counsel 76 to resolve any potential issues and to ensure that such terms and conditions are satisfactory to the seller. If any issues are raised by the potential customer in the form of additions or modifications to the offer are not resolved to the satisfaction of the seller 77, the customer is again sent an email declining the purchase offer or requesting additional clarification. If, however, all issues are adequately resolved 77, 80, the system will check—as it would if the customer had not added any language to the standard offer to purchase 74, 81—to ensure that no red flags exist 82 which could potentially prohibit a sale to the prospective customer. The "red flags" checked may include, in addition to the items described above, abnormally large purchase orders or unusual payment terms. Also, a red flag may be triggered if the customer designates a proscribed country as a product destination in which such product is not allowed delivery into.

Still referencing FIG. 3, if red flags are raised 82, 83, the system again routes the purchase offer to be checked by the seller 84, preferably legal counsel or contract manager. Once checked by counsel 84, the system ensures that all red flags have now been cleared, and if they have not 86, the customer is given the opportunity to clarify the problem areas 88 by providing answers to questions related to the red flags. These answers are checked 88, but at this point if they are deemed unsatisfactory 89 by the seller (or seller's representative or counsel), the potential customer is informed via email the purchase offer must be denied 90. On the other hand, if all red flags are cleared, either prior to checking with counsel 84 as in 82, 91, or after, as in 85, 92 or 88, 93, the offer to purchase is permitted to proceed.

Next, this system checks whether a signed contract has now been received and is on file 92 at the processing center. Preferably, a hand-written or "hard" signature will be on file and the signature will be a verified one. However, it is contemplated that the invention may also provide for electronic signature validation. The purchase offer may also need to come from the agreed source and/or electronic login. A customer contract with signature will be requested 94 if it is missing 93. Once the contract with appropriate signature is received for filing 96, the system is allowed to proceed with the transaction. Once the contract is signed and on file 97, the system determines whether the customer's credit is favorable 98. If not 99, the customer is denied and the customer is notified via email 100. If the customer meets the requisite credit qualifications 101, the customer may proceed with the purchase 102, FIG. 4.

Figure 4:
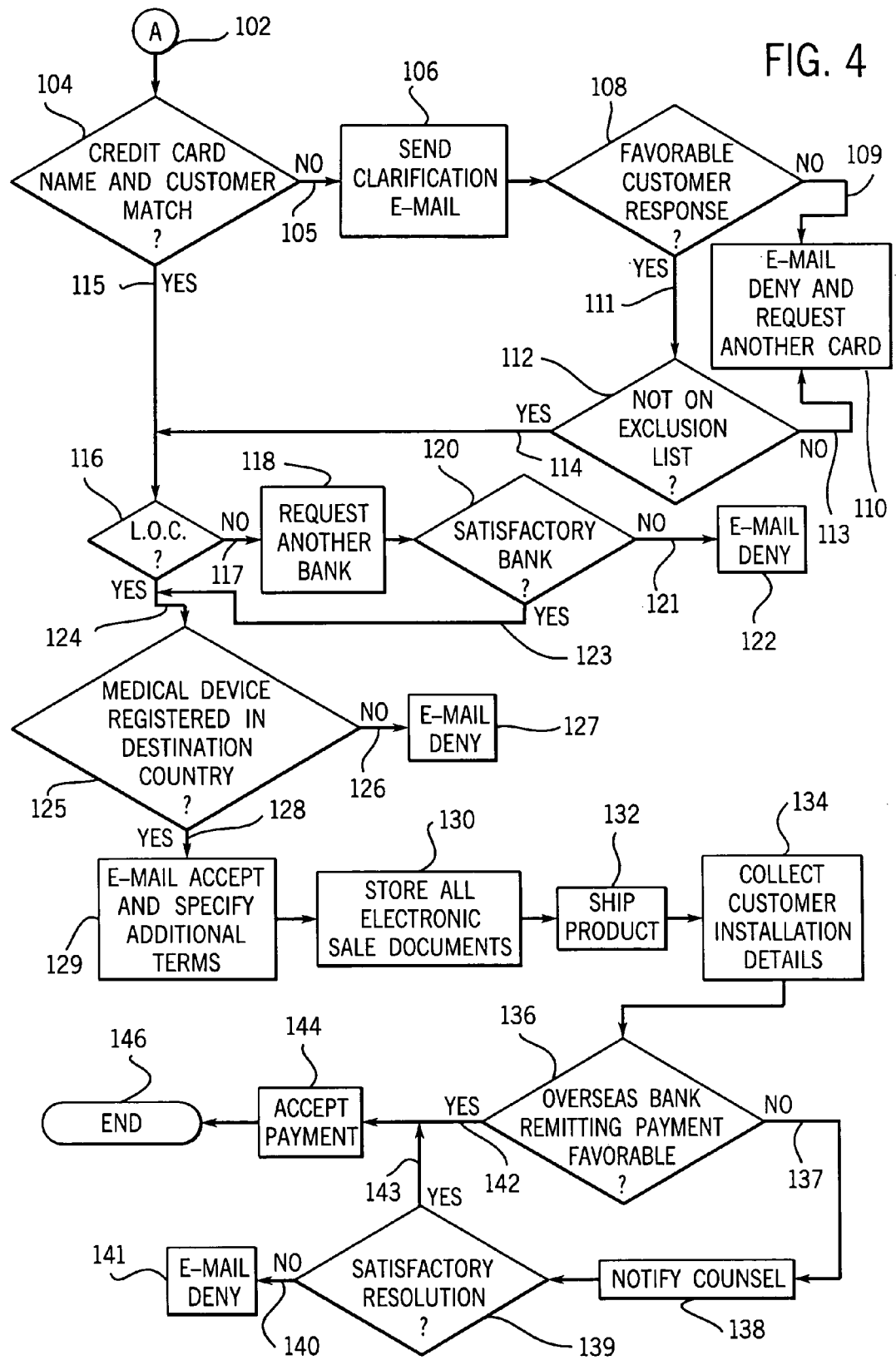

Referring now to FIG. 4, the system next determines whether the name associated with any credit card used for purchase matches the customer name 104, and if not 105, clarification email is sent 106. This step is significant in thwarting any money-laundering attempts by a potential customer, who is known to the seller only by the data entered. Without an acceptable customer response 108, 109, the system will deny any offer to buy and request by email 110 that a different credit card be used by the customer. Following a favorable customer response 108, 111, the system will check 112 whether the customer is on a seller-determined list of excluded customers, such as those identified by the relevant government authorities, and others with whom the seller has had an unsatisfactory transaction history. If the customer is found to be on any exclusionary list 113, the customer will be denied 110 as described above. Otherwise, at 112, 114, the system will permit the customer to proceed 115, as it did at 104, 115 wherein the credit card name and customer matched initially.

The system next checks the prospective approved purchaser to determine whether a letter of credit has been opened on their behalf 116 if the purchase is not by credit card or similar form of payment. If so, the system checks whether the designated overseas financial institution is not on an exclusionary list. The system is configured to check for whatever qualifications the seller may select. For example, the system may be configured to check for past transactions involving the particular lender to determine whether a letter of credit should be accepted. If the customer has indicated an unapproved lender 117, the system requests that the customer select another institution 118. Once another selection has been made, the system will again check to determine whether the designated lending institution is satisfactory 120, and if not 121, the system will notify the customer via email that the transaction will be prohibited 122. However, if satisfactory, 120, 123 or 116, 124, the customer is deemed to have a letter of credit that is sponsored by an approved lender.

At this point, the system determines whether the medical device selected for purchase is registered 125 so as to be in compliance with the requisite rules and regulations of the destination country, and if not 126, the customer is denied the purchase 127, again via email or the local country representative are informed via email to ensure steps are taken to register the product. If accepted, 125, 128, the customer is so notified 129. Further, at this point, all additional terms relating to the purchase are to be specified. For instance, the delivery terms such as date and time might be included. Additionally, all documents pertaining to the purchase are stored 130 according to the seller's retention policies and the product is shipped 132 to the purchaser. Customer installation site details are collected 134 to facilitate potential future interaction between the seller and customer, such as product servicing or compliance with appropriate regulations.

As a final check, the system determines whether the overseas bank remitting the payment for the desired products and/or services are on the exclusionary list. If not 137, the seller's counsel is notified 138 so as to determine whether a satisfactory resolution can be reached 139. If not, 140, the customer will receive email 141 requesting payment by another means. If the overseas bank is approved for payment 136, 142, or if a satisfactory resolution to the problem of having an unapproved overseas bank is reached, 139, 143 (for example, selecting another overseas financial institution) the payment for the product ordered is accepted 144 and the process is then complete 146. At this point, the system has performed a complete screening of the potential customer, in addition to the initial screening. As such, it should be noted that the potential customer's offer to purchase products or services is only accepted by the seller if the potential customer passes both the initial and complete screenings. Therefore, the seller and potential customer only enter into a contract once the seller is satisfied that the customer is qualified to purchase the products which have been specified. If the potential customer is deemed unqualified, the offer to purchase is declined.

In accordance with one aspect of the invention, a method is disclosed for screening a potential customer and assigning an account number to the potential customer before the potential customer may purchase products or services over a computer network, such as the Internet. The invention provides a user interface for a potential customer to access, over the computer network, an automated seller facility. The user interface is configured to allow the potential customer to enter customer data for the to purchase products or services from the automated seller facility. The invention comprises receiving the customer data in the automated seller facility from the customer by way of the user interface and over the computer network. The invention further includes performing an initial screening of the potential customer to determine whether the potential customer is qualified to purchase products or services from the seller. If the potential customer passes the initial screening, an account number is issued. The account number allows the potential customer further access to the automated seller facility. The customer may then proceed to make an offer to purchase products or services from the automated seller facility while the automated seller facility is performing a complete screening.

The complete screening is performed in order to authorize the customer to actually purchase products or services from the automated seller facility. The potential customer's offer to purchase may be accepted by the seller, but only if the potential customer passes the complete screening. The seller's acceptance indicates that the potential customer is qualified to purchase products or services, and that potential customer and seller have then entered into a contract for the products or services desired. In contrast, if the potential customer is not qualified to purchase products or services from the seller, the method provides for declining the potential customer's offer to purchase.

The method also comprises the steps of receiving an existing account number and providing a pre-populated user interface having existing customer data therein. Such existing customer data requires verification by the potential customer, and once verified, the initial screening may be verified. The method further includes the step of periodically querying the accuracy of the existing customer data and stored in a database, and if changes are found to exist, updating the database. The potential customer, if an existing customer having customer data stored in a database, would have provided such customer information during a previous transaction with the seller. It should be noted that the method comprises checking the user interface itself, wherein the potential customer enters the customer data, to confirm that each required field has been completed. Until such time as the fields are completed, the potential customer is restricted from further accessing the automated seller facility.

The method also comprises the step of sending the account number, together with a password and an electronic contract to the potential customer once the customer has passed the initial screening by the seller. Further, the automated seller facility, from which the potential customer offers to purchase products or services, segregates the products or services into restricted or unrestricted product categories. The automated seller facility comprises a supplier network of computers having first and second tier computer systems. The first tier computer system is programmed to receive the customer data to initiate the initial screening of the potential customer, and the second tier computer system programmed to receive the customer data so that the complete screening of the customer may be performed. The complete screening takes place simultaneously with allowing the potential customer to place an offer to purchase. However, it should be noted that the complete screening must be completed prior to authorizing any sale to the potential customer of products or services.

The initial screening comprises the step of determining whether the potential customer is an authorized buyer of products from the restricted product category, and further comprises the step of checking the customer data for the purpose of clearing any red flags. Red flags, as described previously, include inconsistent billing and shipping addresses. The restricted product category, as it applies to the preferred embodiment, includes medical equipment, product or service information pertaining to medical equipment, or medical equipment service.

The complete screening comprises clearing any red flags as well. Here, the clearing comprises checking whether the potential customer has included a method of payment with the offer to purchase products or services from the seller. If the potential customer has included a method of payment, the clearing includes determining whether the method of payment is an authorized one for that particular customer. Further, the complete screening comprises checking whether the potential customer has changed any terms and conditions, defined by the seller, in the offer to purchase products or services. If so, the complete screening includes ensuring that the changes are indeed satisfactory to the seller.

In accordance with another aspect of the invention, the above-described steps are accomplished by a network-based system for screening a potential customer and assigning an account number to that customer. The system also includes a supplier network of computers comprising a first tier computer system that is programmed to receive customer data from a customer accessible computer. The first tier system is further programmed to confirm that the customer data is complete so that a potential customer may be initially screened prior to being issued an account number. Once initially screened and issued an account number, the potential customer is allowed further access to the automated seller facility. The network-based system's supplier network also includes a second tier computer system which is programmed to receive the customer data and perform a complete screening of the potential customer while the potential customer is allowed further access to the automated seller facility to place an offer to purchase products or services from the automated seller facility.

In accordance with another aspect of the invention, a computer readable medium is disclosed having thereon a computer program for use with one or more computers. The programs, when executed, cause the one or more computers to acquire customer information from a potential customer who is able to access, by way of a user interface, an automated seller facility to offer to purchase products or services. The computer program causes the computers to issue an account number to the potential customer if the potential customer passes the initial screening. The account number permits the potential customer to further access the automated seller facility. The computers are then caused to conduct a complete screening while simultaneously allowing the potential customer to place an order for product or services. The computer program includes acts to coincide with the steps of the aforementioned method to implement the aforementioned system.

Although the present invention is readily applicable to screening product orders between a customer and seller for medical devices, it is readily apparent to those skilled in the art that the present invention is applicable to any transaction wherein both the product and customer must be screened before the requisite authorization to complete the transaction may take place.

The present invention has been described in terms of the preferred embodiment, and it is recognized that equivalents, alternatives, and modifications, aside from those expressly stated, are possible and within the scope of the appending claims.

The invention claimed is:

1. A method of screening a potential customer and assigning an account number to the potential customer over a computer network, the method comprising the steps of:
   providing a user interface for a potential customer to access an automated seller facility, the access taking place over a computer network, the user interface allowing the customer to enter customer data for qualification checking by a seller;
   receiving the customer data from the customer in the automated seller facility via the user interface and over the computer network;
   performing an initial screening of the potential customer to determine whether the potential customer is qualified to purchase products/services from the seller; and
   issuing an account number if the potential customer passes the initial screening, thereby allowing the potential customer further access to the automated seller facility to make an offer to purchase products/services from the automated seller facility while the automated seller facility performs a complete screening.

2. The method of claim 1 further comprising the steps of performing a complete screening in order to authorize the potential customer to actually purchase products/services from the automated seller facility if the potential customer is so qualified, accepting the potential customer's offer to purchase products/services only if the potential customer passes the complete screening and thereby only entering into a contract with the potential customer once the seller is satisfied the potential customer is qualified to purchase the products/services, and declining the potential customer's offer to purchase if the potential customer is not qualified by the seller.

3. The method of claim 1 further comprising the steps of receiving an existing account number and providing a pre-populated user interface in response thereto having existing customer data therein, and requiring verification of the existing customer data by the potential customer, thereby bypassing the initial screening step.

4. The method of claim 1 further comprising the step of periodically querying accuracy of customer data from existing customers, and updating a database if any changes are found.

5. The method of claim 4 wherein the customer data comprises information provided by the potential customer during a previous transaction with the seller, the seller having stored the information in the database.

6. The method of claim 1 further comprising the step of sending the account number, together with a password, and an electronic contract to the potential customer after the customer has passed the initial screening.

7. The method of claim 1 further comprising the steps of segregating products/services into restricted and unrestricted product categories within the automated seller facility and wherein the initial screening comprises determining whether the potential customer is an authorized buyer of products from the restricted product category, and checking the customer data to clear any red flags, such as inconsistent billing and shipping addresses.

8. The method of claim 7 wherein the restricted product category includes at least one of: medical equipment, product/service information pertaining to medical equipment, and medical equipment service.

9. The method of claim 1 wherein the complete screening comprises clearing any red flags, including checking whether the potential customer has included a method of payment with an offer to purchase products/services, and if so, determining whether the method of payment is an authorized method of payment for that customer.

10. The method of claim 1 wherein the complete screening comprises checking whether the potential customer has changed any terms and conditions defined by the seller in an offer to purchase products/services, and if so, ensuring that such changes are satisfactory to the seller.

11. The method of claim 1 wherein the user interface includes a plurality of required fields and wherein the method further includes the step of confirming that each required field in the user interface has been completed, and if not, restricting access by the potential customer until all required fields are complete.

12. A computer readable medium having stored thereon a computer program which, when executed by one or more computers, causes the one or more computers to:
acquire customer information at an automated seller facility from a potential customer through a user interface;
perform an initial screening of the potential customer;
issue an account number if the potential customer passes the initial screening, the account number allowing the potential customer to further access the automated seller facility; and
conduct a complete screening while simultaneously allowing the potential customer to place a product/service order.

13. The computer program on the computer readable medium of claim 12 wherein the product/service order is a purchase offer in which the potential customer offers to purchase products/services, and wherein an acceptance of the purchase offer occurs only after the complete screening of the potential customer indicates that the potential customer is authorized to purchase the products/services.

14. The computer program on the computer readable medium of claim 12 wherein the automated seller facility has unrestricted and restricted product categories, the unrestricted product category comprising products/services which may be purchased by a general group of buyers, and the restricted product category comprising products/services pertaining to medical equipment.

15. The computer program on the computer readable medium of claim 14 wherein the potential customer must be an authorized buyer of restricted product category products/services, and is further defined to include licensed health care professionals, those entities that employ licensed health care professionals, and authorized health care distributors.

16. The computer program on the computer readable medium of claim 12 wherein the complete screening comprises clearing any red flags, including at least checking whether the authorized potential customer has provided a method of payment with the product/service order, and if so, checking whether the method of payment is an authorized method of payment.

17. The computer program on the computer readable medium of claim 12 wherein the complete screening comprises at least checking whether the potential customer has changed any terms and conditions in the product/service order, and if so, ensuring that such changes are satisfactory to the seller.

18. A network-based system for screening a potential customer and assigning an account number to the potential customer comprising:
an automated seller facility having a supplier network of computers including:
a first tier computer system programmed to:
receive customer data from a customer accessible computer;
confirm that the customer data is complete;
initially screen the potential customer to allow further access;
issue an account number if the potential customer is determined qualified, wherein the potential customer is allowed further access to the automated seller facility; and
a second tier computer system programmed to receive the customer data from the first tier computer system and perform a complete screen of the potential customer while the potential customer is allowed further access to the automated seller facility to place an offer to purchase products/services from the automated seller facility.

19. The network-based system of claim 18 wherein the automated seller facility has unrestricted and restricted product categories, and wherein the second tier computer system is programmed to determine whether the products/services that the potential customer offers to purchase are from the restricted product category, and if so, the second tier computer system is further programmed to check that the potential customer is an authorized buyer of such restricted products/services.

20. The network-based system of claim 19 wherein the restricted product category comprises at least one of: medical equipment and product/service information pertaining to medical equipment, and the authorized buyer is further defined to include licensed health care professionals, those employing licensed health care professionals, and authorized health care distributors.

21. The network-based system of claim 18 wherein the complete screening comprises clearing any red flags, including checking whether an authorized potential customer has identified a method of payment and determining whether the method of payment is an authorized method of payment.

22. The network-based system of claim 18 wherein the second tier computer system is a globally-accessible computer network having global and regional processing centers.

23. The network-based system of claim 18 wherein the seller defines terms and conditions pertaining to a sale of products/services to the potential customer, and wherein the second tier computer system determines whether the potential customer has changed any of the terms and conditions, and if so, takes action to ensure such changes are satisfactory to the seller.

* * * * *

UNITED STATES PATENT AND TRADEMARK OFFICE
CERTIFICATE OF CORRECTION

PATENT NO.        : 7,822,805 B1
APPLICATION NO.   : 09/468752
DATED             : October 26, 2010
INVENTOR(S)       : Singh et al.

It is certified that error appears in the above-identified patent and that said Letters Patent is hereby corrected as shown below:

On the Title Page, Item (75) City of Fourth Inventor, delete "JohannisbrunnelstraBe" and substitute therefore -- Johannisbrunnelstrabe --.

Col. 10, line 56 (Claim 1), delete "qualification checking" and substitute therefore -- qualification by checking --.

Col. 12, line 29 (Claim 16), delete "complete screening" and substitute therefore -- computer screening --.

Col. 12, line 36 (Claim 17), delete "complete screening" and substitute therefore -- completed screening --.

Signed and Sealed this

Twenty-first Day of December, 2010

David J. Kappos
*Director of the United States Patent and Trademark Office*